(12) United States Patent
Duan et al.

(10) Patent No.: US 7,565,718 B2
(45) Date of Patent: *Jul. 28, 2009

(54) AUTOMATIC OPENING HINGE ASSEMBLY FOR PORTABLE ELECTRONIC DEVICES

(75) Inventors: Chao Duan, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 430 days.

This patent is subject to a terminal disclaimer.

(21) Appl. No.: 11/384,472

(22) Filed: Mar. 20, 2006

(65) Prior Publication Data

US 2006/0242796 A1 Nov. 2, 2006

(30) Foreign Application Priority Data

Apr. 29, 2005 (CN) .......................... 2005 1 0034498

(51) Int. Cl.
*E05D 11/10* (2006.01)
(52) U.S. Cl. .............................. 16/330; 16/324; 16/303
(58) Field of Classification Search ........... 16/337–339, 16/342, 330, 303, 374, 376, 377, 340, 326, 16/324; 361/680–683, 814; 455/90.3, 575.1, 455/575.3, 575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 6,148,480 A | * | 11/2000 | Cooke ......................... | 16/303 |
| 7,007,345 B2 | * | 3/2006 | Nakase et al. .................. | 16/330 |
| 7,124,472 B2 | * | 10/2006 | Duan et al. .................... | 16/303 |
| 7,237,304 B2 | * | 7/2007 | Duan et al. .................... | 16/324 |
| 7,353,568 B2 | * | 4/2008 | Duan et al. .................... | 16/330 |
| 2006/0242795 A1 | * | 11/2006 | Duan et al. .................... | 16/330 |
| 2006/0254026 A1 | * | 11/2006 | Duan et al. .................... | 16/330 |
| 2008/0034541 A1 | * | 2/2008 | Duan et al. .................... | 16/330 |

* cited by examiner

*Primary Examiner*—Chuck Y. Mah
(74) *Attorney, Agent, or Firm*—Steven M. Reiss (57) ABSTRACT

A hinge assembly (200) includes a retaining member (101), a fixing seat (5), a control member (6), a first spring (7), a follower (300), a cam (400), a second spring (9) and a shaft (20). The button has at least one pushing portion (31). The control member has at least one receiving groove (61), and the pushing portion is received in each receiving groove. Each pushing portion resists the control member. The first spring provides an elastic force to the control member. The cam includes an axis hole having an inner screw thread (4342). The second spring provides an elastic force to make the cam and the follower resist each other. The shaft defines an outer screw thread (233). The outer screw thread engages with the inner screw thread of the cam.

20 Claims, 10 Drawing Sheets

AUTOMATIC OPENING HINGE ASSEMBLY FOR PORTABLE ELECTRONIC DEVICES

CROSS-REFERENCE TO RELATED APPLICATIONS

This application is related to two co-pending U.S. patent applications Ser. Nos. 11/384,471 and 11/384,462, both entitled "AUTOMATIC OPENING HINGE ASSEMBLY FOR FOLDABLE ELECTRONIC DEVICES", by Chao Duan et al. Such applications have the same assignee as the instant application and have been concurrently filed herewith. The disclosure of the above identified applications is incorporated herein by reference.

BACKGROUND OF THE INVENTION

1. Field of the Invention

The present invention relates to hinge assemblies and, particularly, to an automatic opening hinge assembly for foldable devices such as portable telephones, portable computers, and so on.

2. Discussion of the Related Art

At present, perhaps the most popular portable electronic device in the marketplace is the foldable mobile telephone, which generally includes a cover section and a body section. The cover section and the body section are rotatably interconnected through a hinge assembly, for switching the telephone between an in-use position and a closed position.

One kind of hinge assembly employs a cam and a follower, which makes the cover section fold outward from the body section and then hold in an open position. The hinge assembly typically includes a cam having a concave portion, a follower having a convex portion, a shaft having a fixing end, and a spring. The cam and the follower are placed around the shaft. The spring resists the follower to make the concave portion tightly contact the convex portion. The cam, the follower, the shaft and the spring are received in a housing. A flip cover rotates about a main body of the mobile phone by overcoming the force of the spring, thus making the concave portion rotate about the convex portion. However, a user must open the mobile phone using both hands. This makes the mobile phone awkward to utilize in situations when the user has only one hand free. In addition, the spring resists the follower. Thus, the follower needs to overcome the resisting force from the spring to rotate. This creates high amounts of strain and friction between the spring and the follower and the longevity of the hinge assembly can thus be affected.

Therefore, a new hinge mechanism is desired in order to overcome the above-described shortcoming.

SUMMARY OF THE INVENTION

One embodiment of the present hinge assembly includes a button, a fixing seat, a control member, a first spring, a follower, a set of rolling elements, a cam, a second spring and a shaft. The button has at least one pushing portion. The fixing seat has at least one block, and each pushing portion passes through the fixing seat. The control member has at least one receiving groove, and the pushing portion is received in each receiving groove. Each pushing portion resists the control member. The first spring provides an elastic force to the control member. The follower includes a first end and an opposite second end. The first end has a cam surface, and the opposite second end defines a containing groove. The rolling elements are received in the containing groove. The ring covers the rolling elements. The cam has a latching cam surface, and the cam includes an axis hole having an inner circumferential wall. The inner circumferential wall defines an inner screw thread. The second spring provides an elastic force to make the cam surface of the follower and the latching cam surface of the cam resist each other. The shaft has an end shaft, and the end shaft defines an outer screw thread. The outer screw thread engages with the inner screw thread of the cam.

Other advantages and novel features of the present hinge assembly will become more apparent from the following detailed description thereof when taken in conjunction with the accompanying drawings.

BRIEF DESCRIPTION OF THE DRAWINGS

Many aspects of the hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION OF THE INVENTION

Figure 1:
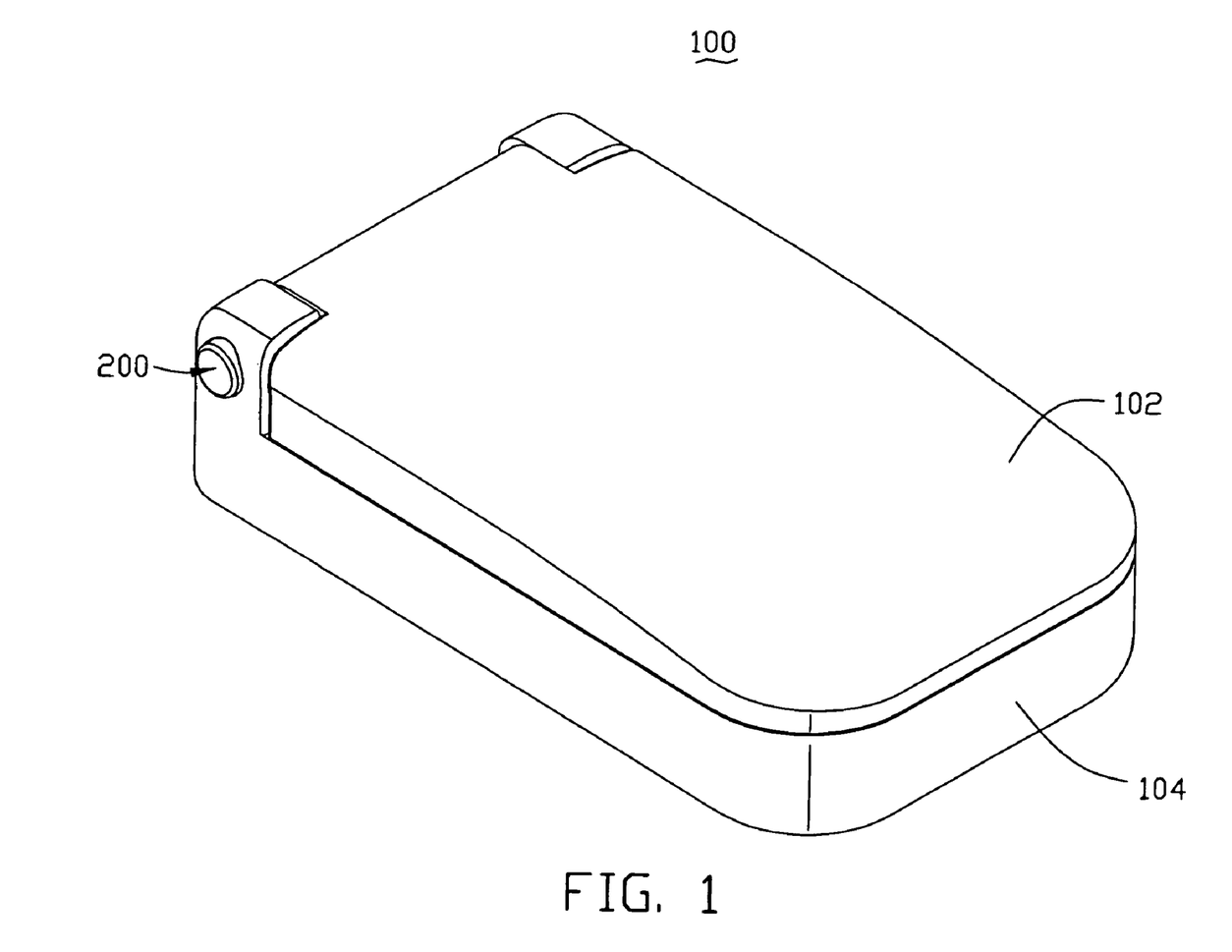
FIG. 1 is an isometric view of an embodiment of the present hinge assembly, as used in a mobile phone.

Referring now to the drawings in detail, FIG. 1 shows a hinge assembly 200, applied to a portable electronic device 100 such as a flip type mobile phone, for pivotably coupling a cover section 102 and a body section 104. It is to be understood, however, that the hinge assembly 200 could be advantageously used in other environments (e.g. cabinet doors). As such, although proving particularly advantageous when used in foldable electronic devices, the hinge assembly 200 should not be considered limited in scope solely to them.

Figure 2:
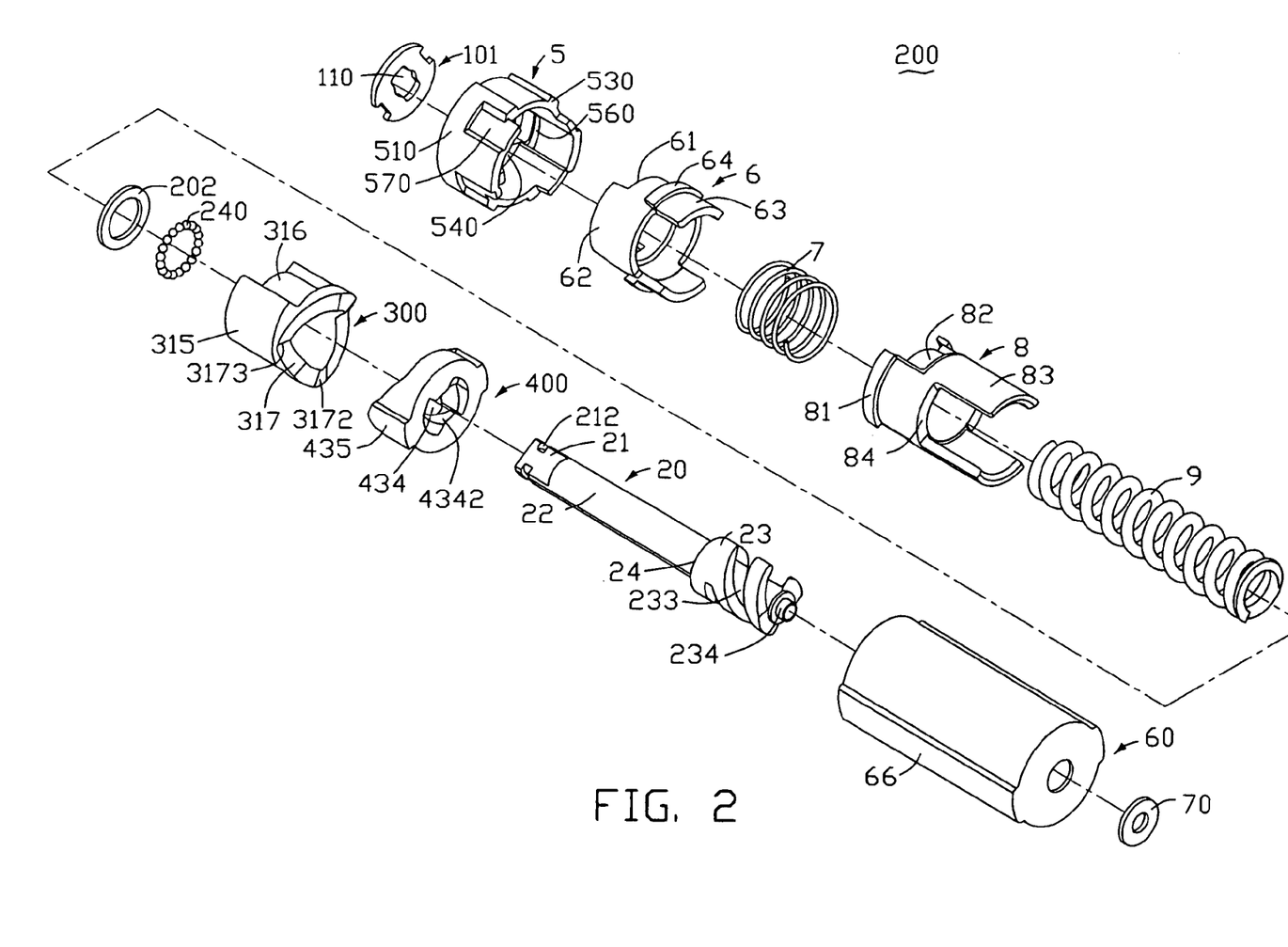
FIG. 2 is an exploded, isometric view of the embodiment of the hinge assembly shown in FIG. 1.
Figure 3:
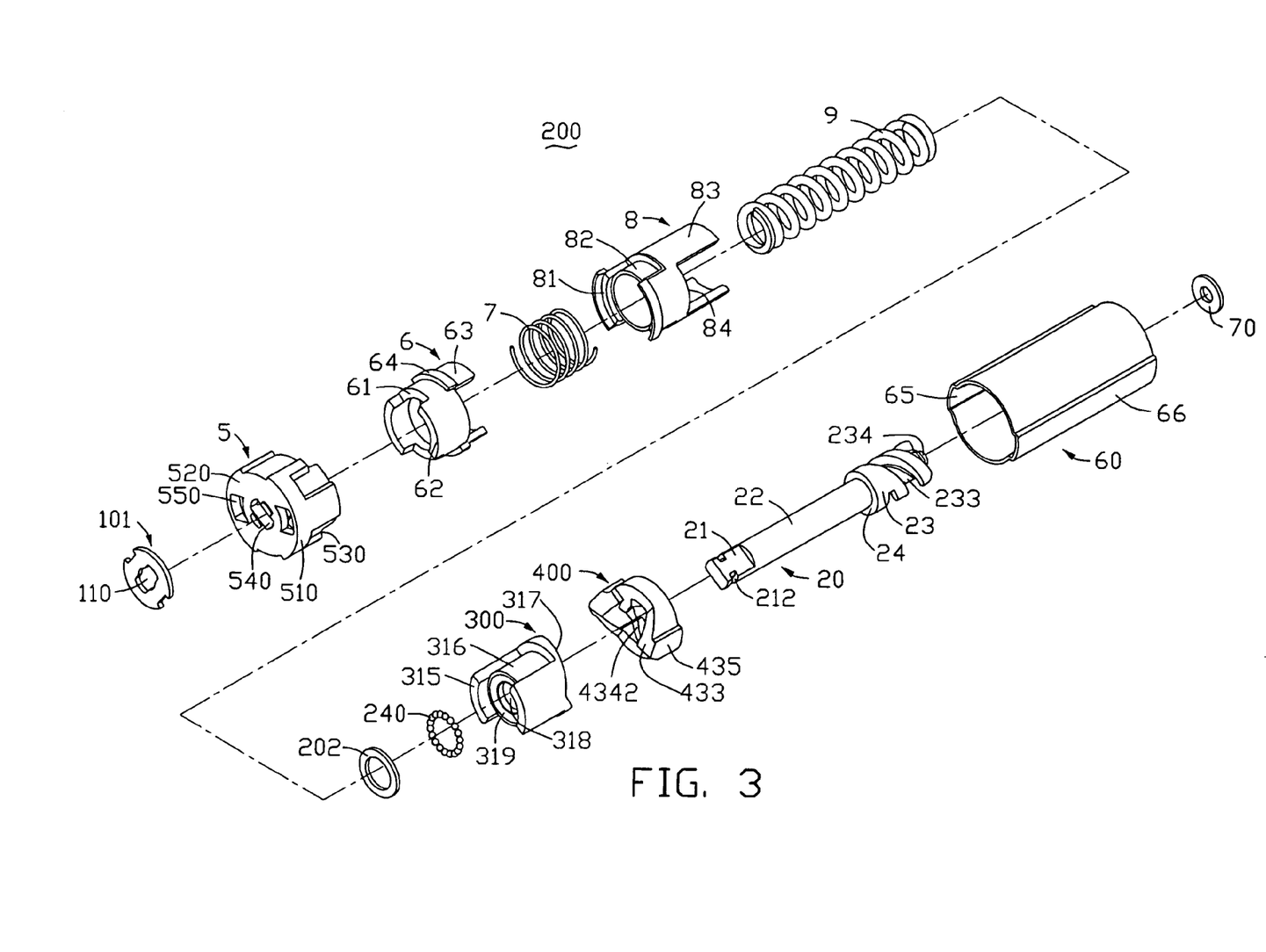
FIG. 3 is similar to FIG. 2, but viewed from another aspect.

Referring to FIGS. 2 and 3, the hinge assembly 200, in one illustrated embodiment, includes a fixing element 101, a fixing seat 5, a control member 6, a first spring 7, a locking member 8, a second spring 9, a ring 202, a set of rolling elements 240, a follower 300, a cam 400, a shaft 20, a sleeve 60 and a washer 70. The fixing element 100, the fixing seat 5, the control member 6, the first spring 7, the locking member 8, the second spring 9, a set of rolling elements 240, the ring 202 and the follower 300 are placed, in that order, to surround the shaft 20 from one end thereof The cam 400 is placed to surround an opposite end of the shaft 20, adjacent to the follower 300. The sleeve 60 receives and surrounds the above elements. The washer 70 is fixed in the opposite end of the shaft 20. The hinge assembly 200 is thus integrated into a whole.

The fixing element 101 is substantially disk-shaped. The fixing element 101 has a deformed hole 110 defined in a central area thereof.

Figure 4:
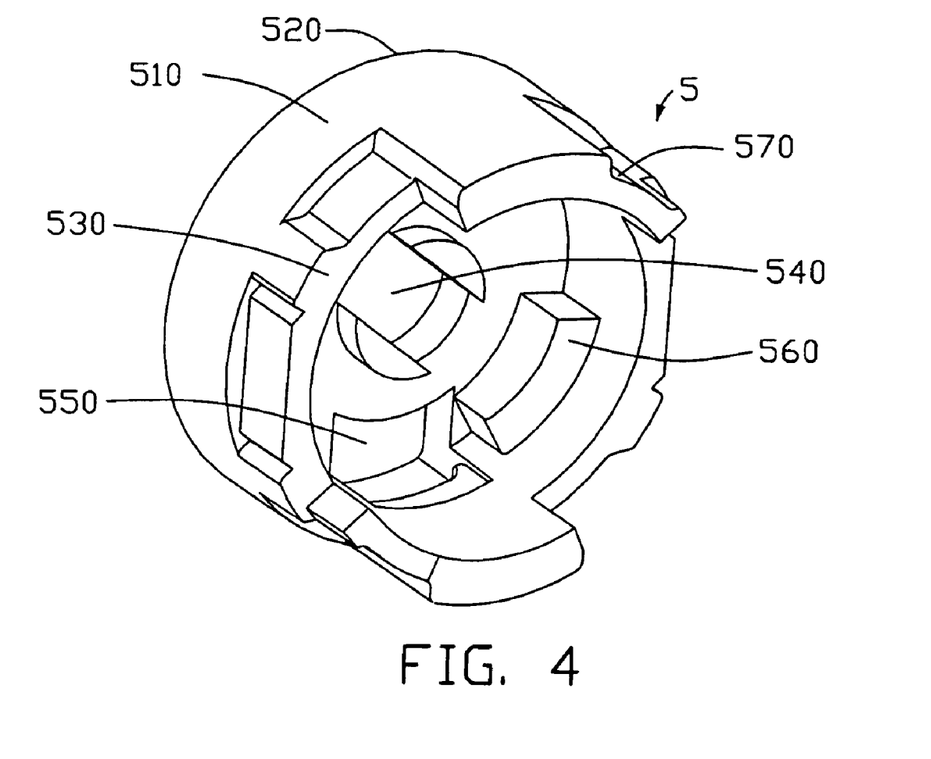
FIG. 4 is an enlarged view of the base seat in FIG. 2.

Referring also to FIG. 4, the fixing seat 5 is substantially cylindrical in shape, and includes an open end and an opposite closed end. The fixing seat 5 has an outside circumferential wall 510 and a bottom wall 520 connected with the outside circumferential wall 510. The outside circumferential wall 510 has two symmetrical openings 530 defined at the open end thereof. The bottom wall 520 has an axis hole 540 defined in a central area thereof Two symmetrical slots 550 are defined in the bottom wall 520 adjacent to the axis hole 540, and the claws 31 of the button 3 are received in the slots 550. The bottom wall 520 has two blocks 560 extending from the closed end toward the open end thereof. The blocks 560 are adjacent to the two slots 550 and against the outside circumferential wall 510. Several reversing grooves 570 are defined in the outside circumferential wall 510, so that the fixing seat 5 can be fixedly retained in the body section 104 of the foldable electronic device 100.

The control member 6 has a cylindrical body, with two opposite receiving grooves 61 defined, and two opposite latching walls 62 formed at one end thereof. The blocks 560 of the fixing seat 5 are for engaging in the receiving grooves 61 and the latching walls 62 are locked between the blocks 560, thereby locking the control member 6 and the fixing seat 5 together. The control member 6 has two opposite protruding posts 63 extending from an opposite end thereof. Two ribs 64 are formed on an outer periphery of the protruding posts 63. The ribs 64 are received into the openings 530 of the fixing seat 5 so that the latching wall 62 may be engaged between the blocks 560 of the fixing seat 5. An inner diameter of the latching wall 62 is smaller than that of the cylindrical body of the control member 6.

The first spring 7 is a cylinder-shaped spring. A diameter of the first spring 7 is approximately the same as that of the cylinder body of the control member 6, while the diameter of the first spring 7 is larger than the inner diameter of the latching walls 62, thereby one end of the first spring 7 resisting the latching wall 62 of the control member 6 at one end.

The locking member 8 is a substantially hollow cylinder in shape, and has two opposite stepped walls 81 disposed in a circumferential wall thereof. Two latching grooves 82 are defined between the stepped walls 81. The protruding posts 63 of the control member 6 may be locked into the latching grooves 82 so that the control member 6 is fixed with the locking member 8. An inner diameter of the stepped walls 81 is smaller than that of the first spring 7, and an outer diameter of the stepped walls 81 is larger than that of the first spring 7, thereby an opposite end of the first spring 7 resists the stepped wall 81 of the locking member 8. The locking member 8 has two extending walls 83 opposite to the stepped wall 81. Thus, two recesses 84 are formed between the extending walls 83.

The second spring 9 is substantially a cylinder (i.e. occupying a cylindrical volume). The spring 9 is placed around the shaft 20. One end of the second spring 9 resists the bottom wall 520 of the fixing seat 5. A diameter of the second spring 9 is smaller than the diameter of the second spring 9 so that the second spring 9 may pass coaxially through the first spring 7.

Figure 5:
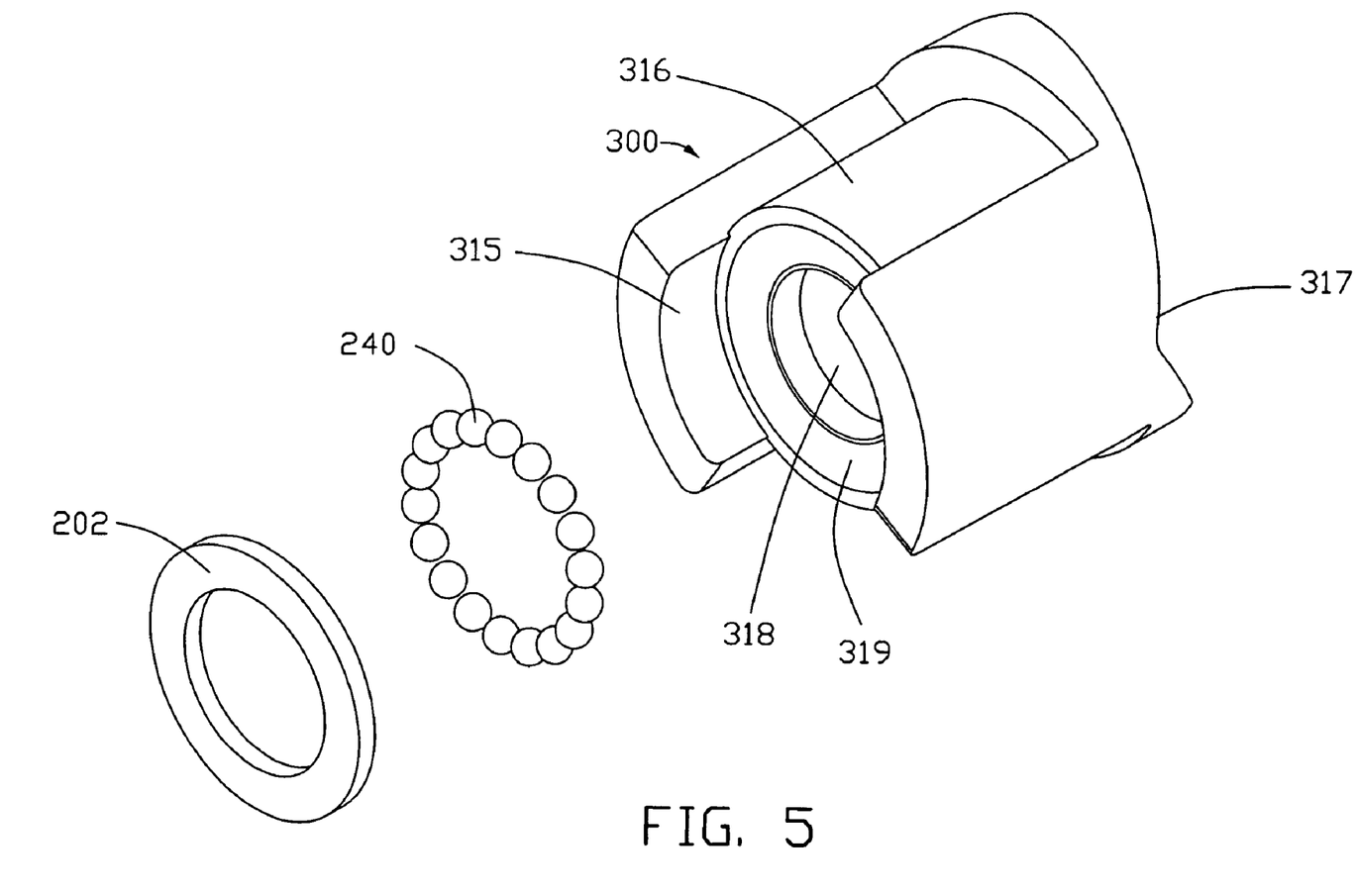
FIG. 5 is an enlarged view of the follower, the ball bearing, and the ring in FIG. 2.

Referring also to FIG. 5, the ring 202 is made of metal. The set of rolling elements 240 are steel ball-bearings.

The follower 300 is substantially cylindrical in shape. Two latching portions 315 extend from one end of the follower 300. Two notches 316 are defined between the latching portions 315. The latching portions 315 may be engaged into the recesses 84 of the control member 8, and the extending walls 83 of the control member 8 may be received in the notches 316. Accordingly, the follower 300 and the control member 8 are locked together. The other end of the follower 300 has a cam surface 317 which includes two peaks 3172 and two valleys 3173. The follower 300 has a stepped hole 318 defined in a central area thereof. A diameter of stepped hole 318 with the cam surface 317 is larger than that of the stepped hole 318 opposite to the cam surface 317. Thus, the second spring 9 resists an end wall of the stepped hole 318. A wall of the stepped hole 318 has a containing groove 319 defined therein, for receiving the rolling element 240.

The shaft 20 orderly includes a deformed shaft 21, a middle shaft 22 and a end shaft 23. A sectional configuration of the deformed shaft 21 is non-circular. A distal end of the deformed shaft 21 has an annular groove 212, and the retaining member 4 is locked into the annular groove 212. The middle shaft 22 is substantially cylindrical in shape, and the end shaft 23 forms a step 24 with the middle shaft 22. The end shaft 23 defines an outside thread 233 and includes a resisting end 234.

The cam 400 is substantially cylindrical in shape. One end of the cam 400 has a latching cam surface 433, which engages with the cam surface 317 of the follower 300. The cam 400 has an axis hole 434 defined in a central area thereof, and an inner thread 4342 is defined in an inner wall of the cam 400. The cam 400 has two parallel engaging protrusions 435 disposed at an outside circumferential wall.

The sleeve 60 is a substantially hollow cylinder in shape and includes an open end and a half-closed end. Two long troughs 65 are defined in an inner wall of the sleeve 60. Accordingly, two sleeve blocks 66 are formed corresponding to the long troughs 65. The sleeve blocks 66 engage with the cover section 102 of the mobile phone 100. The engaging protrusions 35 of the cam 30 engage in the long troughs 65 so that the cam 30 and the sleeve do not rotate relative to each other.

The washer 70 is O-shaped and is fixed on the resisting end 234 of the shaft 20.

Figure 6:
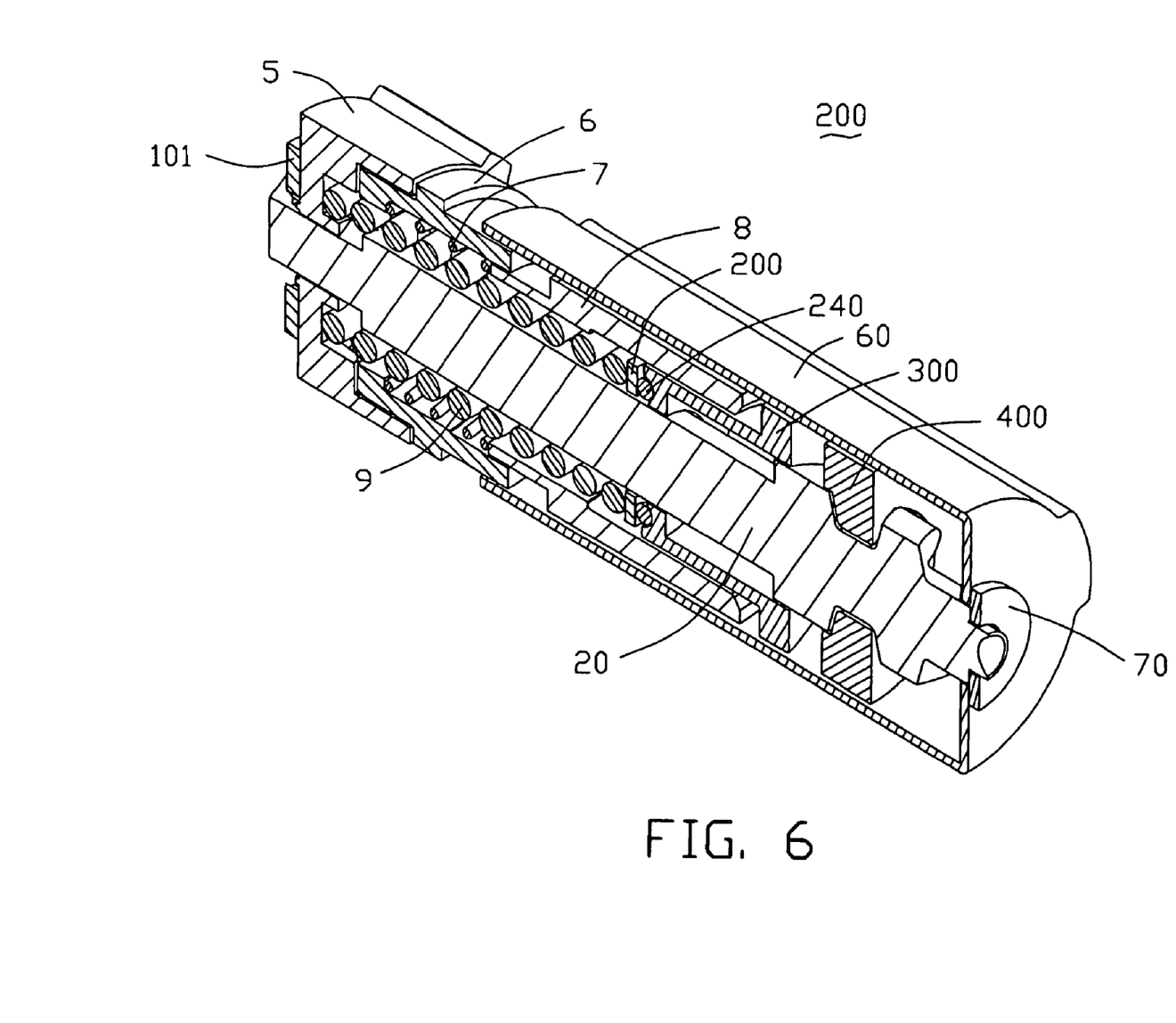
FIG. 6 is a cut-away view when the hinge assembly is assembled shown in FIGS. 2 and 3.

In assembly, referring to FIG. 6, the cam 400 is threaded onto the end shaft 23, with the outer thread 233 of the shaft 20 being engaged with the inner screw thread 4342 of the cam 400. After the cam 400 is placed around the end shaft 23, the follower 300 passes through the deformed shaft 21 of the shaft 20. The cam surface 317 of the follower 300 engages with the latching cam surface 433 of the cam 400. The rolling elements 240 are received into the containing groove 319 of the follower 300. Then, the ring 202 covers the rolling elements 240 so as to prevent the rolling elements 240 from falling off/out. The second spring 9 is placed around the shaft 20, with one end of the second spring 9 resisting the ring 202. After that, the extending walls 83 of the locking member 8 engage with the notches 316 of the follower 300, and the latching portion 315 of the follower 300 are inserted into the recesses 84 of the locking member 8 so that the locking member 8 is locked with the follower 300. The rolling elements 240 directly contact with the follower 300 so that the sliding friction is turned into rotational friction between rolling elements 240 and the follower 300. Accordingly, strain and friction are greatly reduced.

The first spring 7, the control member 6 are placed in order around the shaft 20. One end of the first spring 7 resists the stepped wall 81 of the locking member 8, the other end of the first spring 7 resists the latching wall 62 of the control member 6. The protruding posts 63 of the control member 6 engage in the latching grooves 82 of the locking member 8 so that the control member 6 is fixed together with the locking member 8. Then, the fixing seat 5 is placed around the shaft 20 so that an opposite end of the second spring 9 resists the bottom wall 520 of the fixing seat 5. The deformed shaft 21 of the shaft 20 partially extends out from the axis hole 540 of the fixing seat 5. The blocks 560 of the fixing seat 5 engage with the receiving grooves 61 of the control member 6, and the ribs 64 of the control member 6 engage with the openings 530 of the fixing seat 5, thereby limiting the control member 6 to rotate relative to the fixing seat 5.

The retaining member 100 is locked into the annular groove 212 of the deformed shaft 21. Accordingly, the above elements are fixed to the shaft 20.

The above assembled elements are received into the sleeve 60 along one end with the cam 400. The engaging protrusions 435 of the cam 400 engage in the troughs 65 of the sleeve 60, and the resisting end 234 extends out from the half-closed end of the sleeve 60. The washer 70 is locked onto the resisting end 234 of the shaft 20. Accordingly, the hinge assembly 200 is thus completely assembled, as shown in FIG. 6.

Once the individual hinge components are assembled as described above, the hinge assembly 200 provides a self-contained component that can be sold as an off-the-shelf component or directly incorporated into a mobile phone or other device during manufacture. If incorporated into a mobile phone during manufacture, the sleeve blocks 66 of the sleeve 60 can engage in a cavity (not shown) of the cover section 102 of the mobile phone 100, and the reversing groove 570 of the fixing seat 5 connects with the body section 104 of the mobile phone 100. When the cover section 102 of the mobile phone 100 is in a fully closed position, the second spring 9 has a predetermined pressure. The predetermined pressure of the second spring 9 is exerted in the follower 300 and passed to the cam 400 so that the cam 400 has a rotation tendency relative to the outer screw thread 233 of the end shaft 23. However, the cam 400 is prevented from rotating by the control member 6.

In use, when the user wants to open the cover 102 of the mobile phone 100 automatically, he/she may push the latching walls 62 of the control member 6. The control member 6 moves axially so that the control member 6 moves the first spring 7 towards the cam 400. The first spring 7 accumulates elastic potential energy. When the latching walls 62 of the control member 6 break away from the blocks 560 of the fixing seat 5, the follower 300, and the cam 400 rotates relative to the shaft 20 along the outer screw thread 233. The follower 300 needs to overcome the resisting force form the second spring 9. However, the rolling elements 240 covert the sliding friction between the follower 300 and the second spring 9 into rotating friction, and the abrasion between the second spring 9 and the follower 300 is thus greatly reduced.

When the cam 400 rotates, the follower 300, the locking member 8, the first spring 7 and the control member 6 are brought to move and rotate. Furthermore, the cam 400 brings the sleeve 60 to rotate so that the cover section 102 of the mobile phone 100 is opened. The cam 400 stops rotating when the cover section 102 of the mobile phone 100 is completely opened. The elastic potential energy of the first spring 7 then pushes the control member 6 in a reverse direction towards the cap 2. Accordingly, the latching walls 62 of the control member 6 are locked between the blocks 560 of the fixing seat 5.

When the cover section 102 of the mobile phone 100 is closed, the cover section 102 causes the sleeve 60 to rotate relative to the body section 104. The sleeve 60 further brings the cam 400 to rotate relative to the outer screw thread 233 of the end shaft 23. Because the control member 6 is locked into the blocks 560 of the fixing seat 5, the control member 6 cannot rotate relative to the fixing seat 5. Accordingly, the locking member 8 and the follower 300 do not rotate relative to the fixing seat 5. Thus, the cam 400 rotates relative to the follower 300. When the cam 400 rotates, the follower 300 is pushed toward the fixing element 100. When the cam 400 passes over the peaks 3172 of the follower 300, the second spring 9 accumulates elastic potential energy. When it stops exerting a force, the cam 400 automatically slides into the valleys 3173 of the follower 300 along the cam surface 317 of the follower 300. Accordingly, the cover section 102 becomes closed relative to the body section 104 of the mobile phone 100. The hinge assembly 200 may be opened manually. The principles of the manual opening process are basically the same as the manual closing process but in reverse.

Figure 7:
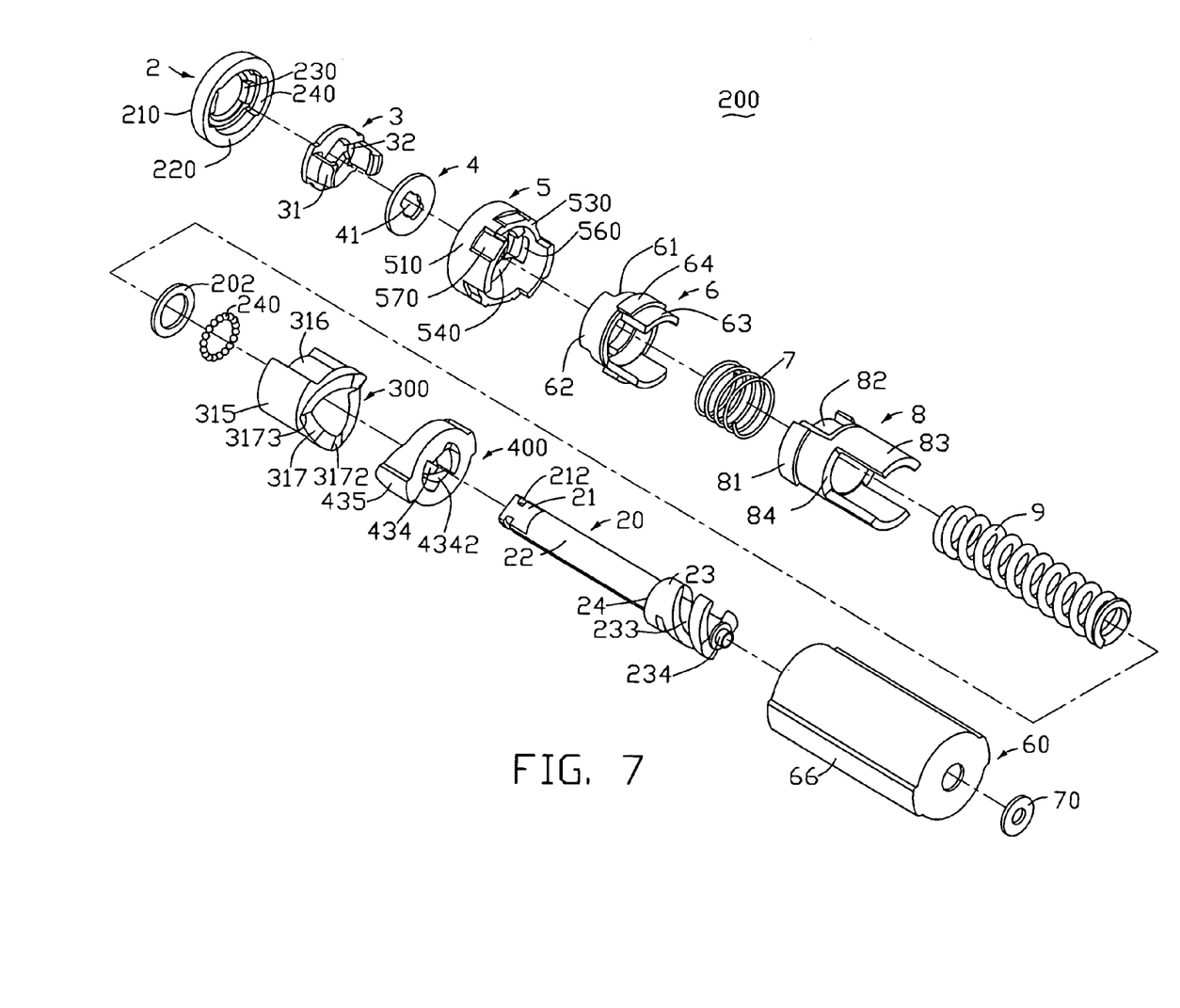
FIG. 7 is an exploded, isometric view of another embodiment of the present hinge assembly.
Figure 8:
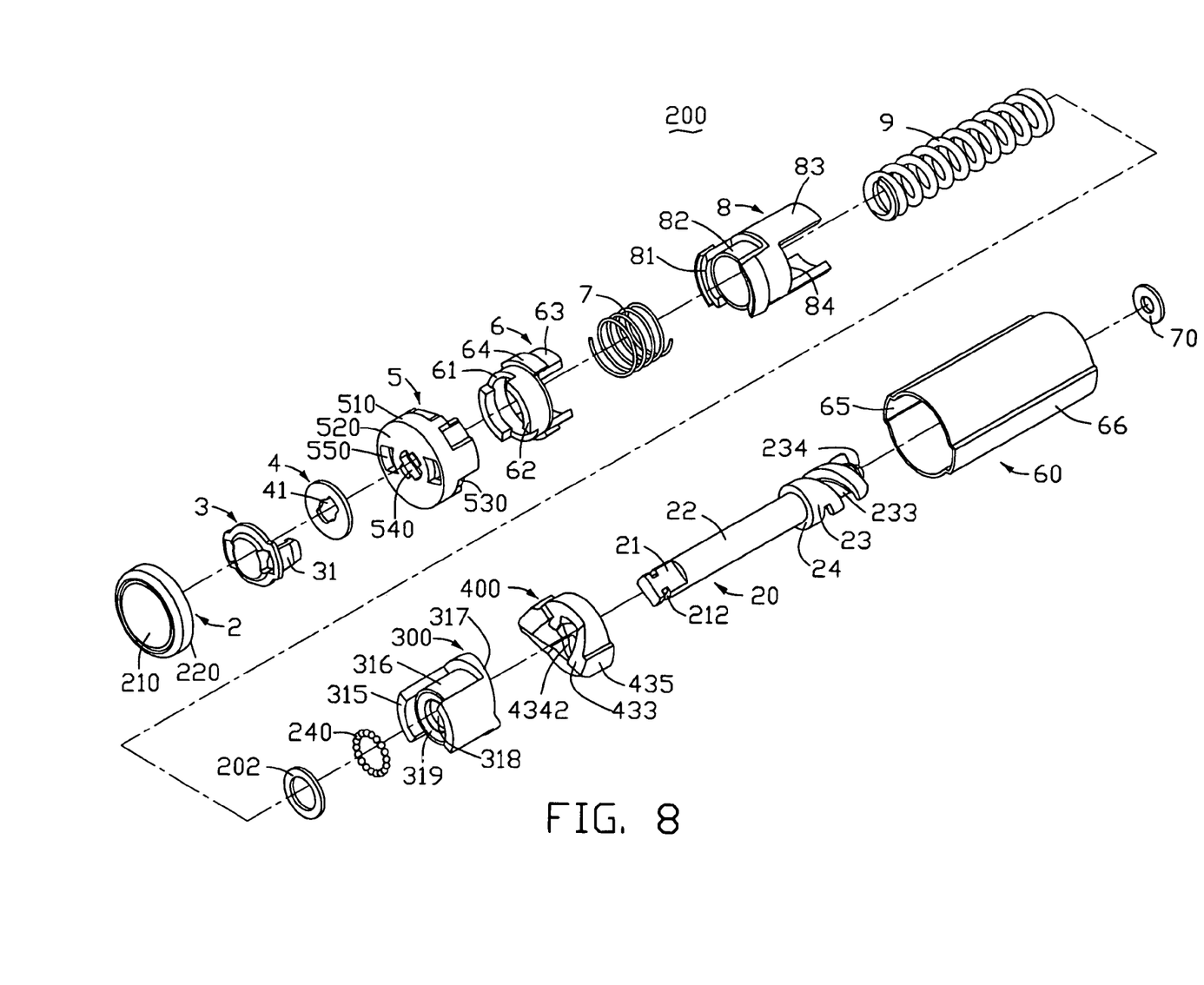
FIG. 8 is similar to FIG. 7, but viewed from another aspect.

The hinge assembly in another embodiment illustrated, referring to FIGS. 7 and 8, includes a cap 2, a button 3, a retaining member 4, a fixing seat 5, a control member 6, a first spring 7, a locking member 8, a second spring 9, a ring 202, a set of rolling elements 240, a follower 300, a cam 400, a shaft 20, a sleeve 60 and a washer 70. The cap 2, the button 3, the retaining member 4, the fixing seat 5, the control member 6, the first spring 7, the locking member 8, the second spring 9, the ring 202 and the follower 300 are placed, in that order, to surround the shaft 20 from one end thereof The cam 400 is placed to surround at an opposite end of the shaft 20, adjacent to the follower 300. The sleeve 60 receives the above elements. The washer 70 is fixed in the opposite end of the shaft 20. The hinge assembly 200 is thus integrated together.

The cap 2 is substantially a hollow disk with a closed end 210 and an open end 220. The cap 2 has two opposite protrusions 230 formed in an inside circumferential wall thereof and extending between the closed end 210 to the open end 220. The cap 2 has two opposite cap grooves 240 defined at the open end 220 thereof. The protrusions 230 are aligned with the cap grooves 240.

The button 3 is substantially a board, and the configuration of the button 3 is configured for the grooves 240, thereby partially received in the cap 2. In the present embodiment, the button 3 may be adhered/attached to the cap 2 and be fixed together. The button 3 has two opposite claws 31 extending from one end thereof opposite to the cap 2. The button 3 has a button hole 32 defined in a central area thereof, and the protrusions 230 of the cap 2 may be locked in the button hole 32.

The retaining member 4 is substantially disk-shaped, and has a deformed hole 41 defined in a central area thereof The structure of the fixing seat 5, the control member 6, the first spring 6, the locking member 8, the second spring 9, the ring 202, the rolling member 240, the follower 300, the cam 400, the shaft 20, the sleeve 60 and the washer 70 is the same as the above embodiment, and is therefore not detailed hereon.

Figure 9:
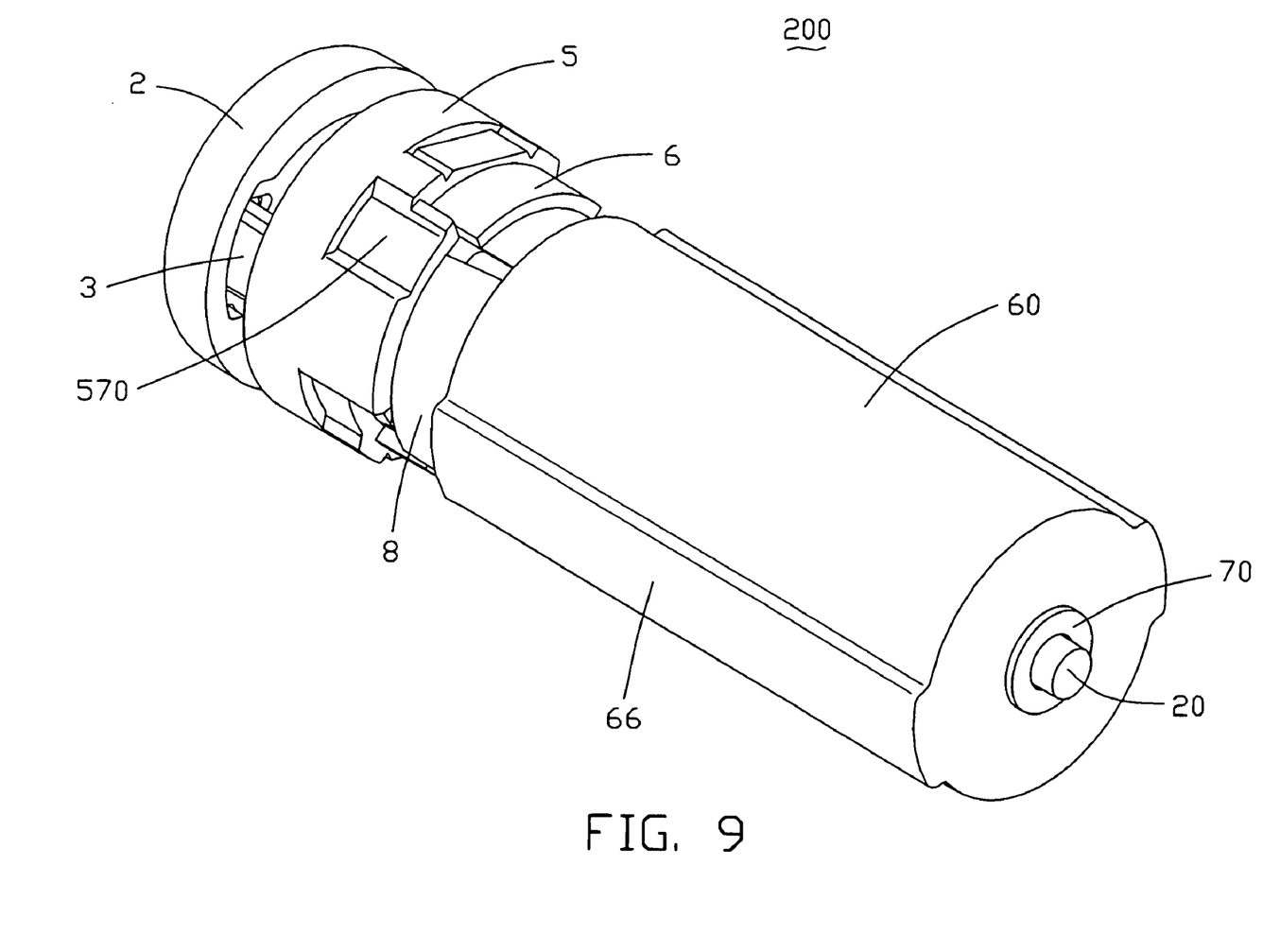
FIG. 9 is an assembled view showing the hinge assembly in FIGS. 7 and 8.
Figure 10:
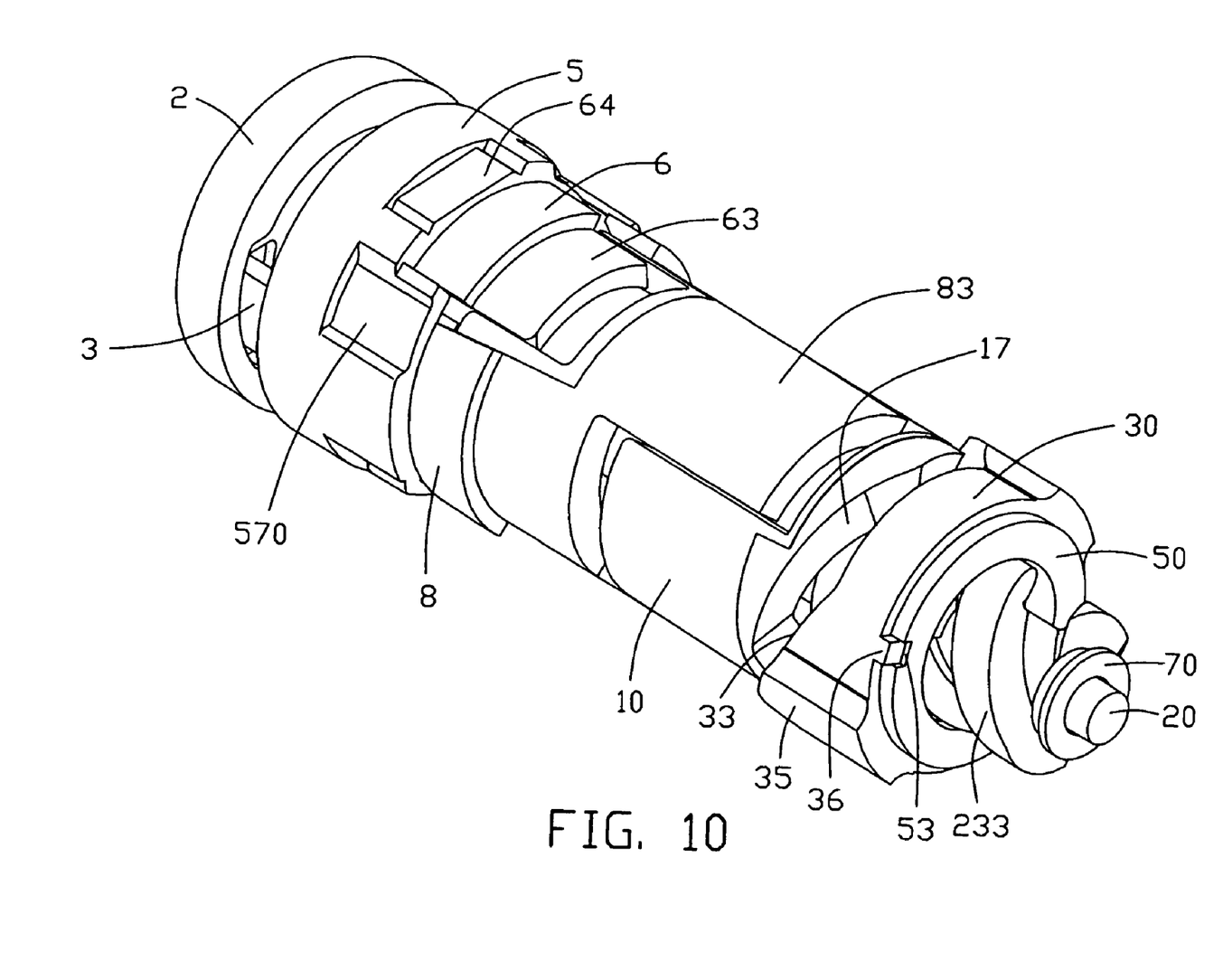
FIG. 10 is similar to FIG. 9, but showing the hinge assembly without the sleeve.

In assembly, referring to FIGS. 9 and 10, the cam 400 is threaded onto the end shaft 23, with the outer thread 233 of the shaft 20 being engaged with the inner screw thread 4342 of the cam 400. After the cam 400 is placed around the end shaft 23, the follower 300 passes through the deformed shaft 21 of the shaft 20. The cam surface 317 of the follower 300 engages with the latching cam surface 433 of the cam 400. The rolling elements 240 are received into the containing groove 319 of the follower 300. Then the ring 202 covers the rolling elements 240. The second spring 9 is placed around the shaft 20, with one end of the second spring 9 resisting the ring 202. After that, the extending walls 83 of the locking member 8 engage with the notches 316 of the follower 300, and the latching portion 315 of the follower 300 are inserted into the recesses 84 of the locking member 8 so that the locking member 8 is locked with the follower 300. The rolling elements 240 directly contacts with the follower 300 so that sliding friction between the second spring 9 and the follower 300 is changed to rotational friction by means of the rolling elements 240. Accordingly, the strain and friction between the follower 300 and the second spring 9 are greatly decreased.

The first spring 7, the control member 6 are placed in order around the shaft 20. One end of the first spring 7 resists the stepped wall 81 of the locking member 8, the other end of the first spring 7 resists the latching wall 62 of the control member 6. The protruding posts 63 of the control member 6 engage with the latching grooves 82 of the locking member 8 so that the control member 6 is fixed together with the locking member 8. Then, the fixing seat 5 is placed around the shaft 20 so that an opposite end of the second spring 9 resists the bottom wall 520 of the fixing seat 5. The deformed shaft 21 of the shaft 20 partially extends out from the axis hole 540 of the fixing seat 5. The blocks 560 of the fixing seat 5 engage with the receiving grooves 61 of the control member 6, and the ribs 64 of the control member 6 engage with the openings 530 of the fixing seat 5, thereby stopping the control member 6 from rotating relative to the fixing seat 5.

The retaining member 4 is locked into the annular groove 212 of the deformed shaft 21. Accordingly, the above elements are fixed to the shaft 20. The protrusions 230 of the cap 2 are inserted into the button holes 32 of the button 3. Then, the button 3 is adhered to the cap 2 so that the button 3 is fixed with the cap 2. The claws 31 of the button 3 are inserted into the slots 550 of the fixing seat 5, thereby locking the claws 31 of the button 3 into the latching walls 62 of the control member 6.

The above assembled elements are received into the sleeve 60 along one end with the cam 400. The engaging protrusions 435 of the cam 400 engage with the troughs 65 of the sleeve 60, and the resisting end 234 extends out from the half-closed end of the sleeve 60. The washer 70 is locked into the resisting end 234 of the shaft 20. Accordingly, the hinge assembly 200 is thus completely assembled, as shown in FIG. 9.

Once the individual hinge components are assembled as described above, the hinge assembly 200 provides a self-contained component that can be sold as an off-the-shelf component or directly incorporated into a mobile phone or other device during manufacture. If incorporated into the mobile phone during manufacture, the sleeve blocks 66 of the sleeve 60 engage in a cavity (not shown) of the cover section 102 of the mobile phone 100, and the reversing groove 570 of the fixing seat 5 engages in the body section 104 of the mobile phone 100. When the cover section 102 of the mobile phone 100 is in a fully closed position, the second spring 9 has a predetermined pressure. The predetermined pressure of the second spring 9 is exerted on the follower 10, and passes from the follower 10 to the cam 30 so that the cam 30 is a rotationally biased relative to the outer screw thread 233 of the end shaft 23. However, the cam 30 cannot rotate because of the limiting action of the control member 6.

In use, when the user wants to open the cover 102 of the mobile phone 100 automatically, he/she may press the cap 2. In this process, the cap 2 brings the button 3 to move along an axial direction, furthermore, the claws 31 of the button 3 push the latching walls 62 of the control member 6. Accordingly, the control member 6 moves axially. The principles of the opening process are basically the same as in the above embodiment, and are therefore not detailed hereon.

In an alternative embodiment, the first spring 7 and the second spring 9 may be replaced by other elastic elements such as elastic sponges.

In an alternative embodiment, the cap 2 may be omitted.

In an alternative embodiment, the locking member 8 may be omitted. Accordingly, the control member 6 directly contacts with the follower 300, and the first spring 7 and the second spring 9 directly resist the follower 300.

As described above, the present invention provides a hinge assembly 200 for use with various portable devices, beyond the mobile phone illustrated, and/or with other devices needing a hinge assembly that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge assembly, comprising:
a button having at least one pushing portion;
a fixing seat having at least one block, each pushing portion of the button extending through the fixing seat for allowing the button to be movably positioned to the fixing seat;
a control member having at least one receiving groove, the at least one block being received in the at least one receiving groove, the at least one pushing portion resisting the control member, the fixing seat releasably engaging with the control member;
a first spring member providing an elastic force to the control member
a follower having a first end and an opposite second end, the first end having a cam surface, the control member engaged with the follower;
a cam having a latching cam surface, the cam including a cam hole having an inner circumferential wall, the inner circumferential wall defining an inner screw thread;
a second spring member providing an elastic force for urging the follower to thereby make the cam surface of the follower and the latching cam surface of the cam resist each other;
a plurality of rolling elements disposed between the second spring member and the follower; and
a shaft defining an outer screw thread, the outer screw thread engaging with the inner screw thread of the cam.

2. The hinge assembly as claimed in claim 1, further comprising a cap, wherein the cap is fixed with the button.

3. The hinge assembly as claimed in claim 1, wherein the fixing seat, the control member, the second spring and the follower are located around one end of the shaft, and the cam is located around another end of the shaft.

4. The hinge assembly as claimed in claim 1, further comprising a locking member, wherein the locking member non-rotatably connects with the control member and the follower.

5. The hinge assembly as claimed in claim 4, wherein the first spring is disposed between the locking member and the control member.

6. The hinge assembly as claimed in claim 5, wherein the control member has at least one protruding post extending from one end, the locking member has at least one latching groove, the at least one protruding post is received in the at least one latching groove.

7. The hinge assembly as claimed in claim 6, wherein the locking member has a stepped wall adjacent to the latching groove, a diameter of the first spring is larger than that of an inner wall the stepped wall, and smaller than that of an outer wall of the stepped wall, the first spring resists the stepped wall.

8. The hinge assembly as claimed in claim 7, wherein the looking member has at least one extending wall opposite to the stepped wall, the follower has at least one notch opposite to the cam surface, the at least one extending wall is received in a corresponding notch.

9. The hinge assembly as claimed in claim 1, wherein the shaft includes a deformed shaft portion, the fixing scat is fixed in the deformed shaft portion.

10. The hinge assembly as claimed in claim 1, wherein the opposite second end of the follower defines a containing groove, the rolling elements are received in the containing groove, the hinge assembly further comprises a ring member, and the second spring member urges the ring member against the rolling elements.

11. A hinge assembly of a foldable electronic device comprising a main body and a flip cover, the hinge assembly comprising:
 a hinge shaft including an outer screw thread thereon;
 a cam attached around the hinge shaft, the cam having an inner screw thread formed on an inner periphery thereof, the inner screw thread engaging with the outer screw thread, the cam having a first cam surface, the cam being configured so as to be fixed relative to one of the main body and the flip cover;
 a follower attached around the hinge shaft, the follower having a second cam surface engaging with the first cam surface;
 a first elastic member;
 a fixing seat configured so as to be fixed relative to the other of the main body and the flip cover;
 a control member fixed relative to the cam follower, and releasably received in the fixing seat; and
 a second elastic member biasing the cam follower against the cam;
 wherein when the control member is axially moved to a first axial position relative to the fixing seat, the control member is released from the fixing seat so as to allow the follower to be rotated with the cam by means of a biasing force generated by the second elastic member; when the control member is axially movable a second axial position relative to the fixing seat, the first elastic member biases the control member to engage with the fixing seat.

12. The hinge assembly as claimed in claim 11, further comprising a locking member, wherein the lacking member non-rotatably connects with the control member and the follower.

13. The hinge assembly as claimed in claim 11, further comprising a set of rolling elements, wherein the follower has a containing groove, the rolling elements are received in the containing groove.

14. The binge assembly as claimed in claim 13, further comprising a ring, wherein the ring covers the containing groove.

15. A foldable electronic device having at least two components hinged together by a hinge assembly, the hinge assembly comprising:
 a button having at least one pushing portion;
 a fixing seat having at least one block, each pushing portion of the button extending through the fixing seat for allowing the button to be movably positioned to the fixing seat;
 a control member having at least one receiving groove receiving the at least one block of the fixing seat, the at least one pushing portion of the button resisting the control member for pushing the control member releasably engaging with the fixing seat;
 a first spring providing an elastic force to the control member;
 a follower having a earn surface;
 a cam having a latching cam surface, the cam including an axis hole having an inner circumferential wall, the inner circumferential wall defining an inner screw thread;
 a second spring providing an elastic force to make the cam surface of the follower and the latching cam surface of the cam resist each other; and
 a shaft having an end shaft, the end shaft defining an outer screw thread, the outer screw thread engaging with the inner screw thread of the cam;
 wherein the fixing seat, the control member, the first spring, the second spring and the follower are located around one end of the shaft and the cam are located round another end of the shaft.

16. The foldable electronic device as claimed in claim 15, wherein the hinge assembly further comprises a locking member, the locking member non-rotatably connects with the control member and the follower.

17. The foldable electronic device as claimed in claim 16, wherein the first spring is disposed between the locking member and the control member.

18. The foldable electronic device as claimed in claim 17, wherein the control member has at least one protruding post extending from one end, the locking member has at least one latching groove, the at least one protruding post is received in the at least one latching groove.

19. The foldable electronic device as claimed in claim 18, wherein the locking member has a stepped wall adjacent to the latching groove, a diameter of the first spring is larger than that of an inner wall the stepped wall, and smaller than that of an outer wall of the stepped wall, the first spring resists the stepped wall.

20. The foldable electronic device as claimed in claim 19, wherein the locking member has at least one extending wall opposite to the stepped wall, the follower has at least one notch opposite to the cam surface, the at least one extending wall is received in a corresponding notch.

* * * * *